United States Patent [19]

Mori et al.

[11] Patent Number: 6,048,831
[45] Date of Patent: Apr. 11, 2000

[54] SURFACTANT COMPOSITION

[75] Inventors: Atsuhito Mori; Yasuo Ishii; Hiroki Sawada, all of Wakayama, Japan

[73] Assignee: Kao Corporation, Tokyo, Japan

[21] Appl. No.: 09/117,186

[22] PCT Filed: Dec. 2, 1997

[86] PCT No.: PCT/JP97/04392

§ 371 Date: Jul. 30, 1998

§ 102(e) Date: Jul. 30, 1998

[87] PCT Pub. No.: WO98/24865

PCT Pub. Date: Jun. 11, 1998

[30] Foreign Application Priority Data

Dec. 2, 1996 [JP] Japan ..................... 8-321270

[51] Int. Cl.[7] ............. C11D 1/722; C11D 1/14; C11D 1/16

[52] U.S. Cl. ............. 510/360; 510/337; 510/351; 510/353; 510/356; 510/357; 510/358; 510/405; 510/421; 510/425; 510/426; 510/492; 510/506; 510/537; 134/42

[58] Field of Search ............. 510/276, 337, 510/351, 353, 356–360, 405, 421, 424–426, 492, 536, 537, 506; 134/42

[56] References Cited

U.S. PATENT DOCUMENTS 4,408,995 10/1983 Guth et al. ..................... 8/447
4,495,092 1/1985 Schmid et al. ..................... 510/537

FOREIGN PATENT DOCUMENTS

| 0 058 139 | 2/1982 | European Pat. Off. . |
|---|---|---|
| 47-9561 | 5/1972 | Japan . |
| 53-58508 | 5/1978 | Japan . |
| 53-113805 | 10/1978 | Japan . |
| 63-110292 | 5/1988 | Japan . |
| 6-76594 | 9/1994 | Japan . |
| 1371770 | 10/1974 | United Kingdom . |
| 1601652 | 11/1981 | United Kingdom . |

*Primary Examiner*—Mark Kopec
*Assistant Examiner*—Brian P. Mruk
*Attorney, Agent, or Firm*—Oblon, Spivak, McClelland, Maier & Neustadt, P.C.

[57] ABSTRACT

A low-viscosity surfactant composition which contains an anionic surfactant and which is excellent in handleability even in a high surfactant concentration range and is easily handleable at room temperature is provided, which comprises (a) a nonionic surfactant represented by the general formula (I) and (b) an anionic surfactant at an (a)/(b) weight ratio ranging from 99/1 to 10/90:

$$RO-(EO)_x-(PO)_y-(EO)_{x'}-H \qquad (I)$$

wherein R represents $C_8$–$C_{20}$ alkyl or the like; EO represents oxyethylene; PO represents oxypropylene; x and x' are each 1 or above; and y is more than 0 but below the sum of x and x', provided $(EO)_x$, $(PO)_y$ and $(EO)_{x'}$ are bonded to each other in block in this order.

9 Claims, No Drawings

SURFACTANT COMPOSITION

TECHNICAL FIELD

The present invention relates to a surfactant composition, more specifically a surfactant composition useful as the liquid detergent for clothes which comprises a specific nonionic surfactant and an anionic surfactant and which exhibits a low viscosity even when mixed with water in a high surfactant concentration, and is therefore excellent in handleability.

BACKGROUND ART

Polyoxyethylene-base nonionic surfactants have high detergency and can also be used favorably in a state combined with other ionic surfactant, so that various combinations thereof with other surfactants have been proposed. In particular, many surfactant compositions comprising such nonionic surfactants and anionic surfactants have been disclosed owing to their excellent detergency. Such surfactant compositions are used mainly as detergent in a state diluted with a diluent such as water.

It is well known that when a nonionic or anionic surfactant is mixed with water in a high concentration, the resulting mixture exhibits a viscosity higher than that of the surfactant itself by ten or more times. In particular, when an anionic surfactant is mixed with water, the resulting mixture exhibits remarkably high viscosity over a wide concentration range to result in difficult handling. Therefore, an anionic surfactant is generally handled as a low-concentration aqueous solution. Economically, it is desirable that a detergent containing a surfactant is free from extra liquid components as far as possible. However, the concentration of a detergent containing an anionic surfactant for useful handling is limited up to about 30 wt %. A composition having a concentration of 50 wt. % or above could little be lowered in the viscosity even by the addition of a diluent such as water, being difficult to handle by the use of a conventional container such as a can or a drum.

In order to solve such a problem, aliphatic alcohols and adducts thereof with alkylene oxides have been proposed in JP-B-6-76594 as viscosity modifier. However, an aqueous surfactant solution containing such an alcohol or adduct still exhibits a viscosity of the order of 10000 cP at 70° C., not permitting easy handling at ordinary temperatures. Further, JP-A-53-58508 has proposed a liquid detergent excellent in fluidity which comprises a polyoxypropylene polyoxyethylene alkyl ether and a polyoxyethylene alkyl ether sulfate, but is silent on the viscosity of the detergent in a high concentration range. Further, an attempt was made to lower the viscosity by the addition of a solubilizing agent. Although the addition of a solubilizing agent gives a remarkable viscosity reducing effect, the addition of some solubilizing agent in a large amount is liable to bring about flammability unfavorably.

Further, EP-A 58139 discloses the treatment of a fabric with both (A) an anionic surfactant and (B) a nonionic block copolymer comprising ethylene oxide units and propylene oxide units, but is silent on the behavior of high-concentration compositions thereof.

As described above, there has not been found as yet any surfactant composition which contains an anionic surfactant and exhibits excellent handleability even in a high surfactant concentration range. Under these circumstance, it has been expected to develop a high-concentration surfactant composition which contains an anionic surfactant and is easily handleable at room temperature.

DISCLOSURE OF INVENTION

An object of the present invention is to provide a low-viscosity surfactant composition which contains an anionic surfactant and which is excellent in handleability even in a high surfactant concentration range and is easily handleable at room temperature.

The inventors of the present invention have intensively studied to develop a high-concentration surfactant composition containing an anionic surfactant and have found that a surfactant composition which can exhibit a low viscosity even in a high surfactant concentration range can be obtained by using a polyalkylene glycol-base nonionic surfactant specified in the mode of addition together with an anionic surfactant to thereby reduce the viscosity build-up due to the anionic surfactant. The present invention has been accomplished on the basis of this finding.

The present invention relates to a surfactant composition comprising (a) a nonionic surfactant represented by the following general formula (I) and (b) an anionic surfactant at an (a)/(b) weight ratio ranging from 99/1 to 10/90:

$$RO-(EO)_x-(PO)_y-(EO)_{x'}-H \qquad (I)$$

wherein R represents $C_8-C_{20}$ linear or branched alkyl or alkenyl; EO represents oxyethylene; PO represents oxypropylene; x and x' represent each a mean number of moles of the ethylene oxide added and are each 1 or above; and y represents a mean number of moles of the propylene oxide added and is a number of more than 0 but below the sum of x and x', provided $(EO)_x$, $(PO)_y$ and $(EO)_{x'}$ are bonded to each other in block in this order.

The mode for carrying out the present invention will now be described in detail.

The nonionic surfactant of the general formula (I) to be used in the present invention as the component (a) can be prepared by reacting an alcohol represented by the general formula (II):

$$R-OH \qquad (II)$$

(wherein R is as defined above) with ethylene oxide, with propylene oxide, and then with ethylene oxide to conduct block addition.

The alcohol represented by the above general formula (II) includes $C_8-C_{20}$ saturated and unsaturated, primary and secondary, linear and branched alcohols. Specific examples thereof include linear alcohols such as decyl alcohol, lauryl alcohol and myristyl alcohol [e.g., "Kalcohl 1095", "Kalcohl 2098" and "Kalcohl 4098" (trade names), products of Kao Corporation]; mixed $C_8-C_{20}$ alcohols [such as "Kalcohl 2474" (trade name), a product of Kao Corporation]; branched $C_8-C_{20}$ alcohols prepared by the oxo method or Ziegler method [such as "Oxocol 900", "Oxocol 1213", "Decanol" and "Tridecanol" (trade names), products of Kyowa Hakko Kogyo Co., Ltd.; "Dobanol 23", "Dobanol 25" and "Diadol 115H" (trade names), products of Mitsubishi Chemical Corp.; and "Neodol 23", "Neodol 25", "Neodol 1" and "Linevol 911" (trade names), products of Shell Chemical]; and so on. It is preferable that the alcohol have 10 to 15 carbon atoms.

The addition reaction of the above alcohol with the alkylene oxides may be conducted by any known alkoxylation method in the presence of a catalyst. The order of addition of the alkylene oxides is essential to the component (a) to be used in the present invention, i.e., the addition reaction with ethylene oxide must be first conducted, following by that with propylene oxide and that with ethylene oxide successively. The catalyst to be used in this alkoxylation may be any of acid catalysts and base catalysts. Further, the catalyst may be a catalyst disclosed in JP-A-7-227540 which can give a narrow range of distribution of addition of alkylene oxide, for example, MgO—ZnO, MgO—SnO, MgO—TiO$_2$ or MgO—SbO, or a Mg catalyst disclosed in JP-A-1-164437 which can selectively give a narrow range of distribution of addition of alkylene oxide.

In the nonionic surfactant represented by the general formula (I), the mean numbers of moles of the ethylene oxide added, i.e., x and x' are each 1 or above. It is desirable that the sum of x and x' is 4 or above, while it is desirable from the handleability that the sum is 20 or below. The sum is more desirably 6 to 15. When the mean number of moles of the ethylene oxide added is 4 or above, the resulting nonionic surfactant will be particularly excellent in the compatibility with water.

On the other hand, the mean number of moles of the propylene oxide added, i.e., y may be selected within the range of more than 0 but below the sum of the mean numbers of moles of the ethylene oxide added, though a higher number of moles thereof leads to poorer biodegradability unfavorably. It is preferable that the mean number of moles of the propylene oxide added be 0.5 to 6.0, still preferably 1.0 to 4.5.

The anionic surfactant to be used in the present invention as the component (b) includes alkylsulfuric acid salts, alkyl ether sulfuric acid salts, alkane-sulfonic acid salts, alkylsulfofatty acid salts, dialkylsulfosuccinic acid salts, alkylbenzenesulfonic acid salts, alkylphosphoric acid salts, fatty acid soaps, carboxymethylated polyoxyethylene alkyl ethers, α-olefinsulfonic acid salts, and α-sulfofatty acid salts, though it is not particularly limited. The anionic surfactant is preferably one selected from among alkylsulfuric acid salts, alkyl ether sulfuric acid salts, alkanesulfonic acid salts, alkylsulfofatty acid salts, dialkylsulfosuccinic acid salts and so on.

In the surfactant composition of the present invention, the weight ratio of the nonionic surfactant (a) to the anionic surfactant (b)(i.e., (a)/(b)) ranges from 99/1 to 10/90, preferably from 99/1 to 50/50. When the (a)/(b) weight ratio is higher than 99/1, the effects due to an anionic surfactant will not be exhibited, while when it is lower than 10/90, the viscosity reducing effect due to the nonionic surfactant will not be exhibited.

It is preferable that the surfactant composition of the present invention contain water at a weight ratio of the sum total of the components (a) and (b) to water {i.e., [(a)+(b)]/water} of 50/50 or above and exhibit a viscosity of 1000 cP or less at 25° C.

That is to say, a mixture comprising the surfactant composition of the present invention and water little suffers from viscosity change and exhibits at 25° C. as low a viscosity as one half or less of that of an aqueous solution of an anionic surfactant only, generally 1000 cP or less, even when the proportion of the sum total of the surfactants to that of the surfactants and water exceeds 50 wt. %. When the viscosity of the mixture at 25° C. is 300 cP or below, an ordinary canned pump or magnetic pump for the transfer of low-viscosity fluid is applicable to the mixture, which brings about a great practical merit favorably. When the mixture has a viscosity of 300 to 1000 cP, it is sufficiently handleable at room temperature. However, the mixture is somewhat lowered in fluidity and therefore necessitates the employment of a special transfer device for high-viscosity fluid instead of an ordinary pump. When the mixture has a viscosity exceeding 1000 cP, it will be difficultly handleable by the use of an ordinary container such as a can or drum owing to its poor fluidity, and the transfer thereof in an industrially sufficient quantity will involve an enlargement in the device or the employment of heating equipment to result in significant disadvantages in the cost.

The surfactant composition of the present invention may further contain other nonionic surfactants, cationic surfactants, amphoteric surfactants, chelating agents, fungicides and so on, as far as the effects of the present invention are not impaired thereby. Further, viscosity modifiers such as viscosity improver and viscosity depressant may be added to the surfactant composition in order to regulate the viscosity of the composition.

Ethanol, isopropyl alcohol and propylene glycol exhibit an excellent viscosity reducing effect and are excellent in safety, thus being favorably usable as the above viscosity depressant. The preferable amount of the viscosity depressant to be added is 0.1 to 10 wt. %. According to the present invention, the addition thereof even in a small amount can attain a satisfactory effect by virtue of the characteristics of the surfactant composition of the present invention. It is particularly preferable from the standpoint of reducing the smell of the solvent that the amount be 0.1 to 5 wt. %.

Examples of the nonionic surfactant to be optionally used in the present invention include amine oxides and polyalkylnene glycol alkyl ethers other than those represented by the above general formula (I). Those of the cationic surfactant to be used therein include aliphatic amine salts and quaternary ammonium salts; and those of the amphoteric surfactants to be used therein include betaines, sulfobetaines and amino acid salts. Examples of the chelating agent include sodium ethylene-diaminetetraacetate and sodium nitrilotriacetate; and the fungicides include benzalkonium chloride and so on.

The surfactant composition of the present invention exhibits a low viscosity even in a high surfactant concentration range to be easily handleable and economical, and it can be easily mixed with other auxiliary components for detergent. Therefore, the composition is not only favorably usable as the detergent for kitchen, house or bathroom or clothes, but also industrially useful as the scouring agent for fibers, the emulsifier for polymerization, the degreasing agent for metals, or the detergent for electronic components.

When the composition of the present invention is used as the liquid detergent for clothes, it can exhibit a uniform and low viscosity and high detergency. Thus, the composition is particularly effective for such use.

The present invention will now be described in more detail by referring to the following Synthesis Examples relating to the preparation of nonionic surfactants and the following Examples of the present invention, though the present invention is not limited by them.

In the following Synthesis Examples and Examples, all percentages are by weight unless otherwise noted.

SYNTHESIS EXAMPLE 1

Synthesis of Nonionic Surfactant Represented by the Formula: $C_{12}H_{25}O—(EO)_5—(PO)_4—(EO)_5—H$ Five hundred grams of lauryl alcohol ["Kalcohl 2098" (trade name), a product of Kao Corporation) and 3.0 g of potassium hydroxide were charged into a 5-1 rotary agitated autoclave equipped with two metering tanks for ethylene oxide and propylene oxide, followed by purging with nitrogen. The contents were heated to 110° C. and dehydrated in a vacuum of 40 Torr for one hour. The resulting contents were heated to 150° C. and 592 g of ethylene oxide was introduced into the autoclave by pressurizing to 3.5 kg/cm$^2$. The resulting contents were reacted until the pressure lowered to become constant. Then, the resulting contents were cooled to 120° C., and 624 g of propylene oxide was introduced into the autoclave by pressurizing to 3.5 kg/cm² in the same way as ethylene oxide. The resulting contents were reacted until the pressure lowered to become constant. Thereafter, the resulting contents were heated again to 150° C., and 592 g of ethylene oxide was introduced thereinto. The resulting mixture were reacted until the pressure lowered to become constant. After the completion of the reaction, the temperature of the contents was lowered, followed by sampling. About 2.3 kg of the objective polyalkylene glycol lauryl ether was obtained.

SYNTHESIS EXAMPLE 2

Synthesis of Nonionic Surfactant Represented by the Formula: $C_{10}H_{21}O$—$(EO)_2$—$(PO)_2$—$(EO)_3$—H In a similar manner to that employed in Synthesis Example 1, decyl alcohol was reacted with 279 g of ethylene oxide, with 368 g of propylene oxide, and then with 418 g of ethylene oxide. About 1.5 kg of the objective polyalkylne glycol decyl ether was obtained.

SYNTHESIS EXAMPLE 3

Synthesis of Nonionic Surfactant Represented by the Formula: $C_{12}H_{25}O$—$(EO)_7$—$(PO)_3$—$(EO)_3$—H In a similar manner to that employed in Synthesis Example 1, lauryl alcohol was reacted with 829 g of ethylene oxide, with 468 g of propylene oxide, and then with 355 g of ethylene oxide. About 2.1 kg of the objective polyalkylne glycol lauryl ether was obtained.

SYNTHESIS EXAMPLE 4

Synthesis of Nonionic Surfactant Represented by the Formula: $C_{12}H_{25}O$—$(EO)_3$—$(PO)_4$—$(EO)_3$—H In a similar manner to that employed in Synthesis Example 1, lauryl alcohol was reacted with 355 g of ethylene oxide, with 625 g of propylene oxide, and then with 355 g of ethylene oxide. About 1.8 kg of the objective polyalkylne glycol lauryl ether was obtained.

SYNTHESIS EXAMPLE 5

Synthesis of Nonionic Surfactant Represented by the Formula: $C_{12}H_{25}O$—$(EO)_6$—H (Comp. Compd.)

In a similar manner to that employed in Synthesis Example 1, lauryl alcohol was reacted only with 710 g of ethylene oxide. Thus, the objective polyethylene glycol lauryl ether was obtained.

SYNTHESIS EXAMPLE 6

Synthesis of Nonionic Surfactant Represented by the Formula: $C_{12}H_{25}O$—$(PO)_4$—$(EO)_{10}$—H (Comp. Compd.)

In a similar manner to that employed in Synthesis Example 1, lauryl alcohol was reacted with 624 g of propylene oxide, and then with 1184 g of ethylene oxide. Thus, the objective polyalkylne glycol lauryl ether was obtained.

SYNTHESIS EXAMPLE 7

Synthesis of Nonionic Surfactant Represented by the Formula: $C_{12}H_{25}O$—$(EO_{10}/PO_2)$—H (Comp. Compd.)

The same lauryl alcohol and catalyst as those used in Synthesis Example 1 in the same amounts as those of Synthesis Example 1 were charged into the same autoclave as that used in Synthesis Example 1. The lauryl alcohol was reacted with a mixture comprising 1184 g of ethylene oxide and 312 g of propylene oxide in a similar manner to that of Synthesis Example 1. About 2.0 kg of the objective polyalkylene glycol lauryl ether was obtained.

EXAMPLES 1 to 7 AND COMPARATIVE EXAMPLES 1 to 4

Surfactant compositions were prepared by mixing the nonionic surfactants listed in Table 1 with the anionic surfactants listed Table 1 at the ratios specified in Table 1 and adding water to the obtained surfactant mixtures at the ratios specified in Table 1.

The surfactant compositions were examined for viscosity by the following method, and evaluated for handleability based on the viscosities thus determined. The results are given in Table 1.

<Measuring method for viscosity>

The viscosity of each surfactant composition at 25° C. was determined by the use of a type E viscometer (mfd. by Toki Commercial Co., Ltd.).

With respect to the handleability, the case wherein the viscosity is 300 cP or less is shown by "⊚", the case wherein the viscosity is more than 300 cP but not exceeds 1000 cP is shown by "○", and the case wherein the viscosity exceeds 1000 cP is shown by "X".

| | Formula of surfactant compn | | | | | | |
|---|---|---|---|---|---|---|---|
| | (a) nonionic surfactant | (b) anionic surfactant | (a)/(b) wt. Ratio | (a) + (b) (%) | water (%) | Viscosity (cp) | Handleability |
| Ex. | | | | | | | |
| 1 | $C_{12}H_{25}O$—$(EO)_5$—$(PO)_4$—$(EO)_5$—H | sodium alkanesulfonate[*1] | 90/10 | 90 | 10 | 147 | ⊚ |
| 2 | $C_{10}H_{21}O$—$(EO)_2$—$(PO)_2$—$(EO)_3$—H | sodium lauryl sulfate | 90/10 | 70 | 30 | 74 | ⊚ |
| 3 | $C_{12}H_{25}O$—$(EO)_7$—$(PO)_3$—$(EO)_3$—H | triethanolamine polyoxyethylene alkyl sulfate[*2] | 75/25 | 70 | 30 | 202 | ⊚ |
| 4 | $C_{10}H_{21}O$—$(EO)_2$—$(PO)_2$—$(EO)_3$—H | sodium alkanesulfonate[*1] | 75/25 | 70 | 30 | 74 | ⊚ |
| 5 | $C_{12}H_{25}O$—$(EO)_3$—$(PO)_4$—$(EO)_3$—H | triethanolamine polyoxyethylene alkyl sulfate[*2] | 75/25 | 70 | 30 | 128 | ⊚ |
| 6 | $C_{12}H_{25}O$—$(EO)_7$—$(PO)_3$—$(EO)_3$—H | sodium dialkyl sulfosuccinate[*3] | 50/50 | 70 | 30 | 72 | ⊚ |
| 7 | $C_{12}H_{25}O$—$(EO)_5$—$(PO)_4$—$(EO)_5$—H | sodium alkanesulfonate[*1] | 50/50 | 50 | 50 | 107 | ⊚ |
| Comp. Ex. | | | | | | | |
| 1 | $C_{12}H_{25}O$—$(EO)_6$—H | sodium lauryl sulfate | 90/10 | 70 | 30 | 4600 | X |
| 2 | $C_{12}H_{25}O$—$(PO)_4$—$(EO)_6$—H | triethanolamine polyoxyethylene alkyl sulfate[*2] | 75/25 | 70 | 30 | 5900 | X |

-continued

Formula of surfactant compn

| | (a) nonionic surfactant | (b) anionic surfactant | (a)/(b) wt. Ratio | (a) + (b) (%) | water (%) | Viscosity (cp) | Handle-ability |
|---|---|---|---|---|---|---|---|
| 3 | $C_{12}H_{25}O-(EO_{10}/PO_2)-H$ | triethanolamine polyoxyethylene alkyl sulfate*² | 75/25 | 70 | 30 | 2700 | × |
| 4 | sec-$C_{12}H_{25}O-(EO)_7-H$ | sodium alkanesulfonate*¹ | 75/25 | 70 | 30 | 5500 | × |

Notes)
*1: Latemul PS (a product of Kao Corporation, trade name)
*2: Emal 20T (a product of Kao Corporation, trade name)
*3: Pelex OTP (a product of Kao Corporation, trade name)

As apparent from the results given in Table 1, the surfactant compositions of the present invention (Examples 1 to7) do not suffer from any viscosity build-up but maintain sufficiently low viscosities. On the other hand, the comparative surfactant compositions containing nonionic surfactants outside the scope of the present invention (Comparative Examples 1 to 4) suffer from such viscosity build-up as to make the handling at room temperature difficult, thus resulting in poor handleability. Examples 8 to 13 and Comparative Examples 5 and 6

Liquid detergent compositions were prepared by the use of nonionic surfactants 1 to 3 prepared in a similar manner to those of Synthesis Examples 1 to 6 according to the formulae specified in Table 2, and examined for detergency, stability (appearance of the composition) and viscosity by the following methods. The results are given in Table 2.

(1) 90 ml of each liquid detergent composition was put in a 100-ml colorless transparent glass bottle, followed by hermetic sealing. The system was allowed to stand for 24 hours and thereafter examined for appearance and viscosity. The viscosity was determined by the use of a Brookfield viscometer (mfd. by Tokyo Keiki Co., Ltd.) at a temperature of the composition of 20° C. Further, the appearance was evaluated according to the following criteria:

○: uniform and transparent, and lowly viscous (300 cP or less)

X: cloudy or separated, and highly viscous (1000 cP or more)

(2) Testing method for detergency

Two grams of a model sebum having the following formulation was applied uniformly on each cotton piece (10 cm X 10 cm). The pieces thus prepared were used as sebum-stained cloths (artifically stained cloths) in this test.

[Formulation of model sebum]

| cottonseed oil | 60 wt. % |
|---|---|
| oleic acid | 10 wt. % |
| palmitic acid | 10 wt. % |
| solid paraffin | 10 wt. % |
| liquid paraffin | 10 wt. % |

[washing conditions and evaluation method]

Five sebum-stained cloths prepared above (artificially stained cloths) were together washed with 11 of a dilute aqueous solution of each sample detergent composition in a Terg-O-Tometer at 1000 rpm under the following conditions.

<washing conditions>

| washing time | 10 min |
|---|---|
| detergent concn. | 0.07 wt. % |
| hardness of water | 4° DH |
| temp. of water | 20° C. |
| rinsing | in tap water for 5 min |

The detergency of each detergent composition was evaluated by examining the nonstained cloth and the stained cloths before and after washing for reflectance at 550 nm by the use of a self-colorimeter (mfd. by Nippon Denshoku Kogyo, Z-300A) and calculating the rate of cleansing (%) according to the following formula (the values given in Table 2 are each an average of the rates of cleansing found with respect to the five cloths).

$$\text{rate of cleansing}(\%) = \frac{\text{reflectance after washing} - \text{reflectance before washing}}{\text{reflectance of nonstained cloth} - \text{reflectance before washing}} \times 100$$

TABLE 2

| | Ex. | | | | | | Comp. Ex. | |
|---|---|---|---|---|---|---|---|---|
| | 8 | 9 | 10 | 11 | 12 | 13 | 5 | 6 |
| nonionic surfactant 1 | 35.0 | | 35.0 | 20.0 | | 20.0 | | |
| nonionic surfactant 2 | | 35.0 | | | 10.0 | | | |
| nonionic surfactant 3 | | | | | | | 20.0 | 35.0 |
| alkylglucoside | | | 3.0 | | | | | |
| LAS—Na | 5.0 | 5.0 | 5.0 | 10.0 | 10.0 | | 10.0 | 5.0 |
| AES—Na | | | | 10.0 | | 20.0 | 10.0 | |
| fatty acid | 1.0 | 1.0 | 1.0 | 3.0 | 10.0 | 2.0 | 3.0 | 1.0 |
| cationic surfactant | 4.0 | 4.0 | 4.0 | | | | | 4.0 |
| monoethanolamine | 4.0 | 4.0 | 4.0 | 3.0 | 7.0 | 3.0 | 3.0 | 4.0 |
| propylene glycol | 2.0 | 2.0 | 2.0 | | | | | 2.0 |
| Sabinase 16. OL | | | | | | 0.2 | | |
| ethanol | 2.0 | 2.0 | 2.0 | 5.0 | 2.0 | 5.0 | 5.0 | 2.0 |
| water | B | B | B | B | B | B | B | B |
| appearance | ○ | ○ | ○ | ○ | ○ | ○ | × | × |
| detergency (%) | 55 | 54 | 56 | 60 | 55 | 57 | 60 | 53 |

Notes)
alkylglucoside: dodecylglucoside (av. deg. of condensation of saccharide: 1.5)
LAS-Na: sodium alkylbenzenesulfonate
AES-Na: polyoxyethylene (mean no. of moles of ethylene oxide added: 4) $C_{12}$ alkyl ether sulfate fatty acid: Lunac L-55 (a product of Kao Corporation)

cationic surfactant: Quartamin 86 W (a product of Kao Corporation)

Sabinase 16.0 L: a product of Novo Nordisk Industry

B: the balance nonionic surfactant 1: $C_{12}H_{25}O-(EO)_7-(PO)_2-(EO)_3-H$ nonionic surfactant 2: $C_{12}H_{25}O-(EO)_5-(PO)_2-(EO)_5-H$ nonionic surfactant 3: $C_{12}H_{25}O-(EO)_8-H$

We claim:

1. A surfactant composition comprising:
   (a) a nonionic surfactant represented by the formula (I)

$$RO-(EO)_x-(PO)_y-(EO)_{x'}-H \qquad (I)$$

wherein
   R represents $C_8-C_{20}$ linear or branched alkyl or alkenyl;
   EO represents oxyethylene;
   PO represents oxypropylene;
   x and x' represent each a mean number of moles of the ethylene oxide added and are each 1 or above; and
   y represents a mean number of moles of the propylene oxide added and is a number more than 0 but below the sum of x and x',
   provided $(EO)_x$, $(PO)_y$ and $(EO)_{x'}$ are bonded to each other in block in this order; and
   (b) an anionic surfactant
   at an (a)/(b) weight ratio ranging from 99/1 to 10/90, wherein when mixed with water in a surfactant amount ≧50wt. %, provides for a composition having a viscosity 1,000 cPs or less.

2. The composition as set forth in claim 1, wherein the (a)/(b) weight ratio lies between 99/1 and 50/50.

3. The composition as set forth in claim 1, which further contains water at a weight ratio of the sum total of the components(a) and (b) to water of 50/50 or above.

4. The composition as set forth in claim 1, wherein the sum of x and x' ranges from 4 to 20.

5. The composition as set forth in claim 1, wherein the anionic surfactant is selected from among alkylsulfuric acid salts, alkyl ether sulfuric acid salts, alkanesulfonic acid salts, alkylsulfofatty acid salts and dialkylsulfosuccinic acid salts.

6. The composition as set forth in claim 1, which further contains at least one solvent selected from among ethanol, isopropyl alcohol and propylene glycol.

7. A liquid detergent for clothes containing the composition as set forth in claim 1.

8. A surfactant composition comprising:
   (a) a nonionic surfactant represented by formula (I);

$$RO-(EO)_x-(PO)_y-(EO)_{x'}-H \qquad (I)$$

wherein
   R represents $C_8-C_{20}$ linear or branched alkyl or alkenyl;
   EO represents oxyethylene;
   PO represents oxypropylene;
   x and x' represent each a mean number of moles of the ethylene oxide added and are each 1 or above; and
   y represents a mean number of moles of the propylene oxide added and is a number more than 0 but below the sum of x and x',
   provided $(EO)_x$, $(PO)_y$ and $(EO)_{x'}$ are bonded to each other in block in this order,
   (b) an anionic surfactant; and
   (C) water
   at an (a)/(b) weight ratio ranging from 99/1 to 10/90 and having a viscosity 1,000 cPs or less.

9. A method of cleaning cloths comprising:
   washing clothes with the surfactant composition of claim 1.

* * * * *